United States Patent [19]

Andersen

[11] Patent Number: 5,460,871
[45] Date of Patent: Oct. 24, 1995

[54] MULTILAYER SHEET MATERIAL AND ARTICLES FORMED THEREFROM

[75] Inventor: Keith C. Andersen, Newark, Del.

[73] Assignee: E. I. du Pont de Nemours and Company, Wilmington, Del.

[21] Appl. No.: 142,634

[22] Filed: Oct. 25, 1993

[51] Int. Cl.$^6$ ............................................. B32B 27/00
[52] U.S. Cl. ........................ 428/287; 428/284; 428/304.4; 441/74
[58] Field of Search ............................ 428/246, 251, 428/252, 284, 285, 287, 304.4; 441/74

[56] References Cited

U.S. PATENT DOCUMENTS

| | | | |
|---|---|---|---|
| 4,183,435 | 1/1980 | Thompson et al. | 206/557 |
| 4,587,155 | 5/1986 | Durand | 428/195 |
| 4,659,618 | 4/1987 | Yazaki et al. | 428/317.7 |
| 4,850,913 | 7/1989 | Szabad, Jr. | 441/65 |
| 5,312,669 | 5/1994 | Bedard | 428/284 |

FOREIGN PATENT DOCUMENTS

| | | |
|---|---|---|
| 61-137740 | 6/1986 | Japan . |
| 62-70019A | 3/1987 | Japan . |
| 3-229779 | 5/1991 | Japan . |
| 5-4295 | 1/1993 | Japan . |

*Primary Examiner*—James J. Bell

[57] ABSTRACT

A multilayer sheet material that is capable of being adhered to a foamed polymer core material is prepared from at least four layers, which are a first outer layer of a printable sheet material, an inner layer of a fibrous sheet material, an inner layer of an adhesive material, and a second outer layer of a weldable sheet material. Stiff foam polymer core articles, such as body boards, having detailed designs on them can be prepared by welding the multilayer sheet material to a foamed polymer core material.

7 Claims, No Drawings

MULTILAYER SHEET MATERIAL AND ARTICLES FORMED THEREFROM

BACKGROUND OF THE INVENTION

The present invention relates to a multilayer sheet material that is capable of being adhered to a foamed polymer core material, to shaped articles made from said multilayer sheet material, and to a process for making said multilayer sheet material.

The present invention arose out of a need to create body boards, or wave boards, surf boards, or skim boards, having intricate designs printed thereon. A body board is a shaped article used primarily for riding on waves. In addition, a body board can be used to skim across or float on water. Body boards generally are made from a polyethylene foam core. One side of the body board may have a cushiony layer for contact against the body. In addition, many body boards have laminated onto the other side of the foam core a layer of high density polyethylene (HDPE). This other side of the board is the side in contact with the water. The HDPE is used to prevent gouging on the surface of the body board. Gouging can be caused, for example, from impact of the body board with sand or shells on the bottom of the ocean.

There currently exists a desire in the marketplace to create body boards having detailed designs printed on them. HDPE, it was found, could be solidly colored or silk screen printed. However, it was not possible to print detailed designs on HDPE via silk screen printing.

Technology has been developed that permits detailed designs to be printed onto certain polymeric sheet materials, such as, for example, polybutylene terephthalate (PBT) sheet. This technology is referred to as sublimation printing and is described in U.S. Pat. No. 4,587,155, incorporated herein by reference. However, it was found to be very difficult to adhere this printable sheet material to a foamed polymer core material because of dissimilar polymeric chemistries between the printable sheet material and the foamed polymer core material. In the present invention, there was discovered a process for making a multilayer sheet material, using this printable sheet material, that could be adhered to a foamed polymer core material. As a result, body boards having detailed designs, which serve to enhance the shelf appeal of the boards, printed thereon could now be produced. In addition, the multilayer sheet material of the present invention, when adhered to a foamed polymer core material, can be shaped into other articles, such as, for example, floating docks, buoys, crash barriers, and rafts. It was further found that a body board made using the multilayer sheet material of the present invention was stiffer than a comparable body board made using conventional HDPE as an outer layer. As such, even if the printable sheet material used in the multilayer sheet material of the present invention does not have a design printed on it, articles made from such a material can be more beneficial than articles made from HDPE in cases where increased stiffness in the resultant article is desired.

SUMMARY OF THE INVENTION

The present invention relates to a multilayer sheet material capable of being adhered to a foamed polymer core material, said multilayer sheet material being comprised of at least four layers, which are a first outer layer of a printable sheet material, an inner layer of a fibrous sheet material, an inner layer of adhesive sheet material, and a second outer layer of a weldable sheet material, with the proviso that each layer must adhere to the layer or layers next to it. The multilayer sheet material is preferably prepared via a co-extrusion process. The multilayer sheet material can be adhered, via the weldable sheet material layer, to a foamed polymeric core material and shaped into articles such as body boards, surf boards, floating docks, buoys, crash barriers, and rafts.

DETAILED DESCRIPTION OF THE INVENTION

The multilayer sheet material of the present invention is comprised of at least four layers, which are as follows: (1) a first outer printable sheet material layer, (2) an inner fibrous sheet material layer, (3) an inner adhesive material layer, and (4) a second outer weldable sheet material layer. The inner layers are used as adhesive transition layers from one type of material to another. The second outer weldable layer permits the multilayer sheet material to adhere to a polymer foam core. The first outer layer is the material that can, if desired, be printed upon. Each layer should adhere to the layer or layers next to it.

The first outer printable sheet material layer can be any material that lends itself to printing. The known types of materials that are printable include polybutylene terephthalate, polyethylene terephthalate, polyamide, polyacetal, polycarbonate, sintered polyethylene, ionomer, (especially zinc ionomer, such as Surlyn®, sold by E. I. du Pont de Nemours and Company) and polyurethane, each of which is a commercially available material or can be prepared by techniques readily available to those skilled in the art. The preferred printable sheet materials are polybutylene terephthalate, polyethylene terephthalate, polyamide, and ionomer, with polybutylene terephthalate and polyethylene terephthalate being most preferred. The thickness of the printable sheet material generally ranges from about 0.25 mm to 2.0 mm, although thickness is not a limiting factor.

The inner fibrous sheet material layer is used to get mechanical interlocking of the printable sheet material layer and the adhesive material layer. The fibrous sheet material layer can be woven or spun. It can be made from fibers of polybutylene terephthalate, polyethylene terephthalate, polyamide, or glass. Preferably, it is made from polyethylene terephthalate. The thickness of the fibrous sheet material layer generally ranges from about 0.025 mm to 3 mm, although thickness is not a limiting factor. Fibrous sheet materials useful herein are commercially available or can be prepared by techniques readily available to those skilled in the art.

The adhesive material layer is used like glue to bond the fibrous sheet material layer and the weldable sheet material layer. Any adhesive is acceptable for use as long as it is extrudable and can adhere to both the fibrous sheet material layer and the weldable sheet material layer or to any layer next to it. Preferred adhesives are (1) ethylene vinyl acetate resins containing 12% or more vinyl acetate, with or without modifiers, and (2) ethylene methyl acrylate resins containing 20% or more methyl acrylate, with or without modifiers. The thickness of the adhesive material layer generally ranges from about 0.025 mm to 1.5 mm, although thickness is not a limiting factor. Adhesive materials useful herein are commercially available or can be prepared by techniques readily available to those skilled in the art.

The weldable sheet material layer is used to adhere the multilayer sheet material to a foamed polymer core material.

Any material can be used as long as it is capable of melting and adhering to the particular foamed polymer core material of choice and adhering to any layer next to it. Preferred weldable sheet materials include polyethylene and ionomer (especially Surlyn® ionomer, referenced above). This layer may be foamed to reduce distortion that may occur in the printable sheet material layer during welding of the multilayer sheet material to the foam polymer core. The level of foam can generally be up to 50% density reduction. The thickness of the weldable layer is generally from about 0.5 mm to 5 mm, although thickness is not a limiting factor.

It is generally preferred, and most economical, that the multilayer sheet material be made from a first outer layer of the printable sheet material, a first inner layer of the fibrous sheet material, a second inner layer of the adhesive material, and a second outer layer of the weldable sheet material. However, it should be understood that there can be other inner layers of materials in addition to the specific inner layers mentioned above. In such a case, any type of material may be used so long as the material does not significantly affect adhesion between the layers of the multilayer sheet material and so long as it adheres to the layers next to it. In addition, the fibrous sheet material layer may be eliminated in the case where there is used an adhesive material that adheres to both the printable sheet material and the weldable sheet material.

The multilayer sheet material is prepared via extrusion processes. In the preferred process, the printable sheet material layer is extruded, by standard techniques, onto the fibrous sheet material layer. In cases where the printable sheet material is to be printed, printing can be done by standard techniques of sublimation printing. Printing can be done on the printable sheet material itself or on the multilayer sheet material. Preferably, printing is done on the printable sheet material after it has been extruded onto the fibrous sheet material. Printable sheet material extruded onto fibrous sheet material is commercially available. An example of such a commercially available material is "Pennite® 2000, plus Reemay®", sold by Penn Fibre.

After the printable sheet material layer is extruded onto the fibrous sheet material layer, the other layers of the multilayer sheet material are adhered to it, via a co-extrusion process. In the co-extrusion process, the inner adhesive material and the outer weldable sheet material are melted in two separate extruders connected by either a coextrusion sheet die or a coextrusion distribution block. The temperature settings for the extruders are dependent upon the melting point of the materials contained therein. The temperature setting should be high enough to cause the material to melt, but not so high that the material degrades or decomposes. As the molten materials exit the extruders, they are combined into a two-layer configuration by the coextrusion die and applied, using standard melt coating techniques, to the previously extruded printable sheet material/fibrous sheet material layer, such that the adhesive material layer adheres to the fibrous sheet material to form the multilayer sheet material. Alternatively, a coextrusion distribution block attached to a conventional sheet die could be used to combine the adhesive material layer and the weldable sheet material layer into a two layer configuration suitable for the melt coating step. In cases where additional inner layers are used, each inner layer material is melted by an extruder and distributed to the proper location using standard coextrusion techniques and equipment.

Alternatively, and less economically than the above process, the multilayer sheet material can be prepared by simultaneously adhering all layers together. In such a case, the process is accomplished via dual coating of the fibrous sheet material layer. Specifically, the fibrous sheet material is melt coated. Simultaneously, on one side of the fibrous sheet material, the printable sheet material is extruded thereon and on the other side of the fibrous sheet material, the inner adhesive material layer and the outer weldable sheet material layer are co-extruded thereon. Such a process requires at least three extruders while the process described above can be accomplished with only two extruders. In cases where additional inner layers are used, each inner layer material is melted by an extruder and distributed to the proper location using standard coextrusion techniques and equipment.

The resultant multilayer sheet material can be adhered to a foamed polymer core material by standard techniques. The preferred foamed polymer core material is selected from foamed polyethylene and foamed ionomer. The thickness of the foamed polymer core material is dependent upon the desired shaped article. For body boards, it is generally about 50 mm thick, although thickness is not a limiting factor.

The multilayer sheet material can be adhered to the foamed polymer core material by running the multilayer sheet material through any device capable of supplying heat, such as a quartz heater, in order to melt the weldable sheet layer. The foamed polymer core material can be shaped prior to this step. The throughput rate for the multilayer sheet material should be sufficient to permit the weldable layer to melt. The melted weldable sheet layer side of the multilayer sheet material is merged with one side of the foamed polymer core material and adhered to the core through use of any pressure device, such as pressure rolls.

The resultant product can then be shaped into the desired shaped article by standard techniques.

EXAMPLES

The example given below is meant to illustrate, not limit, the present invention.

A body board can be made as described below.

The multilayer sheet material was prepared from the materials described below.

(1) Commercially available "Pennite® 2000, plus Reemay®", sold by Penn Fibre, was used for the printable sheet material/fibrous sheet material layers. Specifically, this material was a polybutylene terephthalate sheet material (i.e., the printable sheet material) backed with Reemay®, which was a polyethylene terephthalate fibrous sheet material layer. A space shuttle cockpit detailed design was printed by sublimation printing on the printable sheet material side of the "Pennite® 2000, plus Reemay®" material. The thickness of the printable sheet material was about ½ mm and the thickness of the fibrous sheet material was about ½ mm.

(2) The adhesive material layer was made of ethylene vinyl acetate. It contained 18% vinyl acetate, along with conventional modifiers. It is sold commercially by E. I. du Pont de Nemours and Company as Bynel® 418. The thickness of the adhesive layer was about 0.25 mm.

(3) The outer weldable sheet material layer was low density polyethylene, sold commercially as Petrothene® (Grade NA 204000) by Quantum. It was foamed with 2% of a conventional foaming agent to a 35% density reduction.

The multilayer sheet material was prepared by co-extruding the adhesive material and the low density polyethylene material onto the Reemay® side of the "Pennite® 2000, plus Reemay®" material, with the adhesive material layer being next to the Reemay® layer. The low density polyethylene outer weldable layer was extruded in a two extruder co-extrusion machine with coating capability, built by Sano Company, a division of Cincinnati Milcron, under the following conditions: melt temperature setting—213° C.; output setting—1.75 kg/s; screw speed setting—100 rpm; head pressure reading—14.5 MPa; and barrel temperature settings—177° C. to 203° C. The adhesive layer was extruded using the same co-extrusion machine (but a different extruder) as was used for the low density polyethylene layer. The extrusion conditions were as follows: melt temperature setting—232° C.; output setting—0.28 kg/s; screw speed setting—50 rpm; head pressure reading—10.2 MPa; and barrel temperature settings—193° C. to 204° C. On the co-extrusion machine, the combining block setting was 191° C., the die settings (left, center, and right) were each 180° C., the primary and secondary chill roll settings were each 27° C., the line speed setting was 0.04 m/s, and the pull roll torque setting was 13.5 N-m.

A body board is formed from the resultant multilayer sheet material by machining one end of a rectangular foamed polyethylene core into the front, rounded shape of a typical body board. The thickness of the core is about 50 mm. The polyethylene foam core is a commercial product sold by ARCO as Arcel®.

The multilayer printed sheet material prepared above is fed past a quartz heater, at a rate of about 10 feet per minute, to melt the weldable sheet material layer on the outer side of the multilayer sheet material. From the quartz heater, the multilayer printed sheet material was fed by rollers onto the foamed polyethylene core material, with the melted weldable layer outer side being in contact with the foamed core material. The multilayer sheet material/foamed core material was fed through a set of pressure rolls with 445N of force on the rolls to complete the adhering of the printed multilayer sheet material to the foamed polyethylene core.

The shaping of the body board is finished by hand with a knife. The body board is then finished by covering the other side of the foamed polymer core material with a 2-3 mm thick layer of low density polyethylene and welding it to the foamed polyethylene core with a hot air gun. This low density polyethylene layer serves as a cushion for contact against the body.

The finished product was compared to a product similar to it, except that this other product had an outer layer of high density polyethylene (HDPE) in place of the printable polybutylene terephthalate/Reemay®/adhesive layers used in the finished product of the above example. It was found that the product having HDPE as its outer layer creased when kicked while the product of the above example did not crease when tested under similar conditions. As such, the product of the example above was stiffer than a comparable product having HDPE as the outer layer.

What is claimed is:

1. A multilayer sheet material that is adhered to a foamed polymer core material, said multilayer sheet material being comprised of at least four layers, which are (1) a first outer layer of a printable sheet material, (2) an inner layer of a fibrous sheet material, (3) an inner layer of an adhesive material, and (4) a second outer layer of a weldable sheet material, with the proviso that each layer adhere to the layer or layers next to it and wherein the sheet material is adhered to the foamed polymer core material via the weldable sheet material layer.

2. The foamed polymer core material of claim 1 that is selected from foamed ionomer.

3. The multilayer sheet material of claim 1 wherein the printable sheet material is a polybutylene terephthalate sheet material, the fibrous sheet material is a polyethylene terephthalate sheet material, the adhesive material is an ethylene vinyl acetate resin material, and the weldable sheet material is a foamed polyethylene.

4. The multilayer sheet material that is adhered to a foamed polymer core material of claim 1 and that is made into a shaped article.

5. The shaped article of claim 4 that is selected from floating docks, buoys, crash barriers, rafts, body boards, and surf boards.

6. The multilayer sheet material that is adhered to a polyethylene foamed core of claim 1 and that is shaped into a body board.

7. The body board of claim 6 that has a design printed on it.

* * * * *

UNITED STATES PATENT AND TRADEMARK OFFICE
CERTIFICATE OF CORRECTION

PATENT NO. : 5,460,871

DATED : Oct. 24, 1995

INVENTOR(S) : Keith C. Andersen

It is certified that error appears in the above-identified patent and that said Letters Patent is hereby corrected as shown below:

Claim 2, column 6, line 25, insert -foamed polyethylene and- after the word "from".

Signed and Sealed this

Sixteenth Day of April, 1996

Attest:

BRUCE LEHMAN

Attesting Officer

Commissioner of Patents and Trademarks